Figure 3:
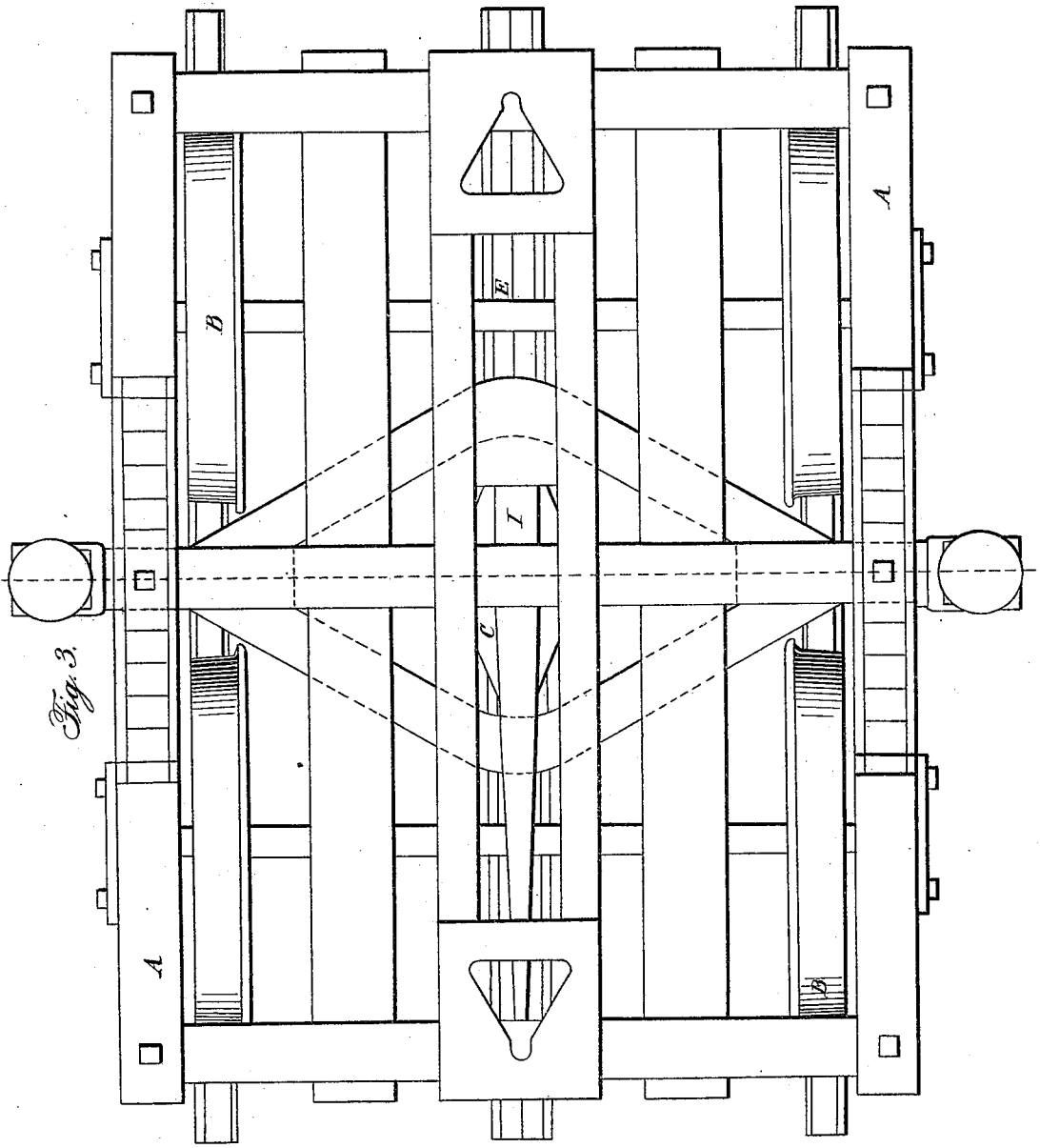

E. STANLEY.
Car Truck.
No. 9,224.
2 Sheets—Sheet 1.
Patented Aug. 24, 1852.
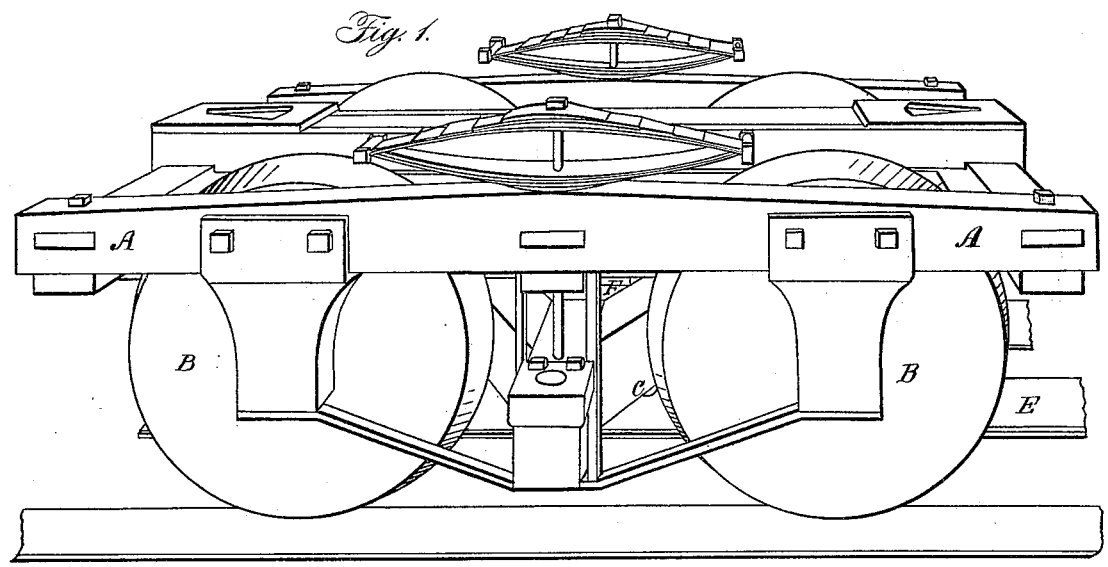
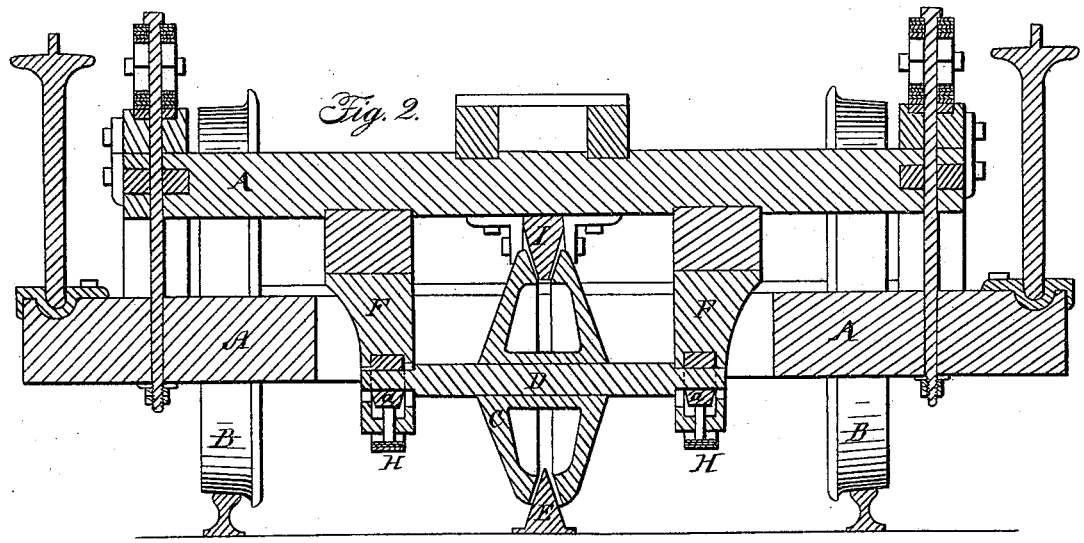

E. STANLEY.
Car Truck.

No. 9,224.

2 Sheets—Sheet 2.

Patented Aug. 24, 1852.

UNITED STATES PATENT OFFICE.

EDWIN STANLEY, OF BENNINGTON, NEW YORK.

RAILROAD-TRUCK.

Specification of Letters Patent No. 9,224, dated August 24, 1852.

*To all whom it may concern:*

Be it known that I, EDWIN STANLEY, of Bennington, in the county of Wyoming and State of New York, have invented certain Improvements in Trucks of Railroad-Cars, which are described in the following specification, of which the accompanying drawings and references form a part, with sufficient clearness and precision to enable competent car-builders and engineers to make and use my invention.

My invention consists in providing each truck with one or two wheels placed equidistant between the rails upon which the cars run; which wheels are properly constructed to run upon an A shaped rail laid down for that purpose; said wheel or wheels being made hollow, as shown in Figure 2, to prevent the clogging of the wheel with snow or other substances and also to give it a more firm hold of the rail when it is used as a brake-wheel to arrest the progress of the cars as hereinafter set forth. The objects of this wheel, are, to keep the cars from being thrown from the track by obstructions, the breaking of a rail, or other causes; to prevent the breaking of axles caused by the flanges of the running wheels pressing against the rails; and also to be used as a brake-wheel in bringing the cars to rest for the purpose of avoiding the usual ruinous wear upon the running wheels caused by using them for that purpose.

Fig. 1, of the accompanying drawings is a perspective view; and Fig. 2, is a vertical transverse section of the truck and rails. Fig. 3 is a plan.

A, A, is the frame of the truck. B, B, are the wheels upon which they usually run, hung to the truck in any of the usual ways. C, is the wheel first above mentioned, only one being represented which is deemed sufficient for each truck when used in connection with the improvements patented by Thomas P. How, March 11, 1851, with which improvements it is here represented. It may be nearly as large as the running wheels, or not to exceed one half the size, or any intermediate size as may suit the circumstances of different cases; it is however here represented in about the form and proportion preferred by the inventor for common use, Figs. 2 and 3, being drawn on a scale of one and a half inches per foot. This wheel is hung upon an axle or shaft D, which revolves in bearings a, a, said axle being allowed end-play in said bearings sufficient to allow the trucks their necessary lateral motion upon the track, but not sufficient to allow the running wheels upon either side to pass outside of the rails they being retained by the action of the wheel C, upon the rail E, which enters the wheel sufficiently far to prevent its being thrown off by any ordinary obstruction connected with the cars or with the road upon which they run. The bearings a, a, are made so as to vibrate in the hangers F, F, by which they are secured to the frame of the truck.

H, H, are springs which raise the wheel C, from the rail by raising the bearings a, a. These raise it sufficiently to prevent its weight from resting upon the rail but not enough to prevent its efficient action in case it is needed to keep the truck upon the track, or to keep it from supporting the truck in case a running wheel or one of their axles should break.

When it is desirable to bring the cars to rest the brake I, (which is hung in a fulcrum either forward or back of the top of the wheel C, and continued in the form of a lever lengthwise of the truck) is pressed down upon said wheel which forces it down upon the rail, and the friction of the brake opposing its revolution it operates by friction upon the rail E, in proportion to the pressure applied to it to bring the cars to rest.

I claim as my invention—

1. The combination of the brake I with the wheel C, and rail E, arranged and operating substantially as described.

2. Making the wheel C, substantially as herein described, for the purposes of preventing from clogging with snow or other substances, and giving it a better hold upon the rail as above suggested.

EDWIN STANLEY.

Witnesses:
ELIAS E. HOLT,
THOMAS P. HOW.